(No Model.)
J. W. RAMSEY.
HYDRANT AND PLUG.
No. 300,282. Patented June 10, 1884.
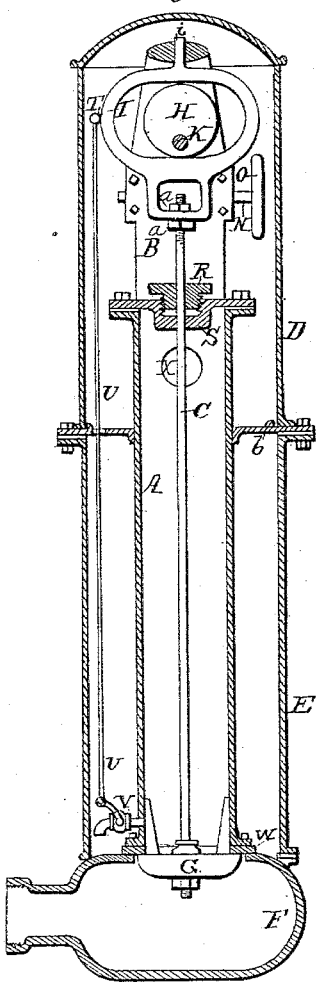
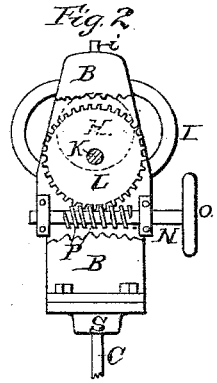
Attest:
N. C. Nunnemann
E. E. Masson
Inventor:
John W. Ramsey
by T. B. Brock
Atty.

UNITED STATES PATENT OFFICE.

JOHN W. RAMSEY, OF BEAVER FALLS, PENNSYLVANIA, ASSIGNOR OF ONE-HALF TO JOHN CORBUS, OF SAME PLACE.

HYDRANT AND PLUG.

SPECIFICATION forming part of Letters Patent No. 300,282, dated June 10, 1884.

Application filed February 14, 1884. (No model.)

*To all whom it may concern:*

Be it known that I, JOHN W. RAMSEY, a citizen of the United States, residing at Beaver Falls, in the county of Beaver and State of Pennsylvania, have invented certain new and useful Improvements in Fire-Plugs or Hydrants; and I do hereby declare the following to be a full, clear, and exact description of the invention, such as will enable others skilled in the art to which it appertains to make and use the same.

Figure 1 is a vertical central section of a fire-plug or hydrant, to which my improvements have been applied. Fig. 2 is a side elevation of the frame or standard B, to which the operating parts are attached. (Shown in a reverse position from that illustrated in Fig. 1.)

My invention has for its object the employment of a powerful and direct means for securing the turning on of the water, no matter in what direction the operating-wheel may be turned.

To secure this object, my invention consists in the combination and arrangement of a hand-wheel, worm-wheel and shaft meshing with a gear-wheel whose arbor carries a cam or eccentric adapted to operate within a yoke, to give the latter a vertical motion, and which yoke carries the valve-rod. A novel packing and valve-seat combined is also used in the valve-chamber.

I will now describe my improvement more particularly in connection with the accompanying sheet of drawings.

To the valve-chamber F, which communicates with the street-main or other pipe by its nozzle, is secured the pipe A by means of flanges and bolts. Interposed between the contiguous flanges of the pipe A and chamber F is packing W, preferably made of rubber; which serves the double purpose of a packing-joint and a valve-seat for the valve G. The upper part of pipe A is provided with the outlet X.

S is a cap on the upper end of pipe A, secured thereon by suitable flange-connections; and it constitutes, together with the adjusting-nut R, a stuffing-box for the valve-rod C, where it passes upward out of the pipe A.

The valve G has the usual guide-wings, and the valve-rod is adjustable, with relation to the valve and the yoke I, by means of nuts *a a* upon the upper threaded end of the rod. The vertical motion of the yoke I and its valve-rod connection for opening and closing the valve G is attained by means of an eccentric, H, keyed upon the shaft K. This shaft is mounted in the standard B, and carries a toothed gear, L, which meshes with a worm, P, formed upon the shaft N. This shaft N is mounted upon the standard in suitable bearings, and carries the operating hand-wheel O.

The standard B, which carries the above-operating parts, is bolted to the cap S on the top of the pipe A. The upper arch of the standard is pierced with an opening for the reception of the square stem or dowel-pin *i*, which is cast or formed with the yoke I. This stem serves the purpose of a guide, and also prevents any lateral movement of the yoke.

To the yoke I is affixed a pin, T, to which is attached an auxiliary valve-rod, U, to the lower end of which is pivoted the lever-arm of the valve or cock V. This cock is operated in conjunction with the valve G, the arrangement being such that when the valve G is opened the cock V will remain closed, and vice versa, the latter serving to drain the pipe A when the water-supply is cut off, in order to prevent freezing.

The jacket E is generally cast in halves, and surrounds the pipe A below the ground-level. The annular flange *b* may either be cast separately or with the pipe A. It surmounts the jacket E, and serves as a base-plate, upon which the cylindrical cover D rests.

When it is desired to let on the water, the hand-wheel O is turned, it matters not whether to the right or left, when, through the action of the worm P, gear L, cam H, and yoke I, the valve-rod C is forced downward, and the valve G opened against the head of water, the cock V being at the same time closed by its valve-rod U attached to the same yoke.

In fire-plugs, especially where it is necessary to open a large valve against the head of water in the main, it has been found difficult to open such plugs with the facility which the urgency of the case demands. This difficulty arises from several causes, among which, in extreme cold weather, is the formation of ice, to a greater or less extent, around the valve-seat. With my improved form of hydrant or fire-plug I secure the employment of a powerful mechanism for opening the valve instantly by the turning of the valve in either direction, the closing of the valve being similarly accomplished.

I am aware that it is not new to provide a hydrant with a cam and yoke arranged to operate a valve. Such a construction, for instance, is shown in the patent to B. E. Lehman, No. 156,578; and I therefore do not claim that broadly, but only in connection with the gear-wheel, worm, and hand-wheel for securing a powerful mechanism for instantly unseating the valve against the pressure in the main.

What I claim is—

In a fire-plug or hydrant, the valve G, the valve-rod C, the yoke I, attached to the valve-rod, the shaft K, carrying the cam H and the gear L, and the shaft N, carrying the hand-wheel O and the worm P, the latter meshing with the gear L, and the whole arranged to act in combination, for the purpose substantially herein specified.

In testimony whereof I affix my signature in presence of two witnesses.

JOHN W. RAMSEY.

Witnesses:
  A. J. LAWRENCE,
  C. P. WALLACE.